Patented Apr. 25, 1933

1,905,095

UNITED STATES PATENT OFFICE

EDWARD T. HOWELL, OF MILWAUKEE, AND ROBERT J. GOODRICH, OF SOUTH MILWAUKEE, WISCONSIN, ASSIGNORS, BY MESNE ASSIGNMENTS, TO E. I. DU PONT DE NEMOURS & COMPANY, A CORPORATION OF DELAWARE

BLACK VAT DYESTUFF PREPARATION

No Drawing. Application filed May 21, 1930. Serial No. 454,506.

This invention relates to vat dyestuff preparations and more particularly to such preparations as print fibrous materials in shades of black.

Black dyestuffs of the vat family are rather rare and expensive. On the other hand, there is a great demand in the art for such dyestuffs and hence a real need for an economical manner of preparing these products.

We have now found that when the dyestuff known to the trade as Anthrene dark blue BO (Color Index No. 1099; dibenzanthrone) is mixed with a yellow or an orange vat dyestuff in certain proportions, a mixture results with which cotton and other fibrous materials can be printed in black shades. One of the yellow dyestuffs particularly suited for this purpose is Anthrene yellow G (Color Index No. 1118; flavanthrone). In view of the original colors of the components of such mixture, and the common knowledge that a mixture of blue and yellow pigments produces a green, it was indeed unexpected that in this case the final color produced by printing with our mixture should be black.

It is accordingly an object of our invention to provide a simple, economical method of obtaining vat dyestuff preparations which print in black or in various color shades of black.

It is a further important object of this invention to prepare such vat dyestuffs by mixing together known vat colors in certain proportions.

Other and further important objects of this invention will become apparent from the following description and appended claims.

The relative proportions of the blue and yellow dyestuffs in our mixtures may vary within rather wide limits. Thus, the percentage of the yellow component may be anywhere between 10 and 50%. Near the lower limit of this range, the dyestuff mixtures prepared produce on the fibre a black having a violet tinge, due to the predominance of the dark blue component; while near the upper limit the dyestuff mixtures produce a greenish black. Over the major portion of this range, however, the resulting composite mixture produces fast, black prints on cotton and the like.

If desired, various pronounced shades may be given the above black dyestuff preparations by additions thereto of one or more components having a characteristic color. For instance, the black color of said preparation will assume a greenish shade upon the addition or incorporation in the mixture of a green vat color such as Anthrene jade green (Color Index No. 1101; dimethoxy-dibenzanthrone). Of course, the depth of such greenish shade will vary, depending upon the amount of green dye employed.

The new products of this invention are particularly adapted for printing cotton and other fibrous materials. In such use their printing qualities may be improved by incorporating various assisting agents in the mixture; such as, for example, diethylene glycol and thio-diglycol as disclosed in the co-pending application of Howell and Goodrich, Serial No. 426,437, filed February 6, 1930.

The following examples in which parts by weight are given serve to more particularly illustrate the nature of our invention.

Example 1

77 parts of Anthrene dark blue BO (Color Index No. 1099) double strength 26 parts of Anthrene jade green (Color Index No. 1101) single strength, and 9.5 parts of Anthrene yellow G (Color Index No. 1118) double strength, all in paste form, are mixed together and 38 parts of diethylene glycol added thereto. This mixture is then carefully evaporated to a final weight of 100 parts. The resulting composition when employed to print on cotton in the usual manner produces a black shade of the usual fastness of vat dyestuffs.

Example 2

The procedure followed is the same as in Example 1 except that the following proportions of the ingredients are employed:
80 parts of Anthrene dark blue BO,
10 parts of Anthrene jade green,
20 parts of Anthrene yellow G, and
30 parts of diethylene glycol.
This mixture produces black prints of a greener shade than the dyestuff of Example 1.

Example 3

80 parts of Anthrene dark blue BO
12 parts of Anthrene golden orange G (Color Index No. 1096) single strength
8 parts of Anthrene yellow G
40 parts of diethylene glycol
are mixed together and the mixture evaporated to a weight of 100 parts. This composition prints cotton in black prints of the usual fastness qualities characteristic of vat dyestuffs.

Example 4

80 parts of Anthrene dark blue BO,
20 parts of Anthrene yellow G,
50 parts of diethylene glycol
are mixed together and evaporated to a weight of 100 parts. The resulting product prints cotton in fast, black prints.

Example 5

72 parts of Anthrene dark blue BO,
12 parts of Anthrene jade green,
16 parts of Anthrene yellow AG (Color Index No. 1132) double strength, and
36 parts of diethylene glycol
are mixed together and carefully evaporated to a final weight of 100 parts. This composition also produces black prints on cotton.

Example 6

80 parts of Anthrene dark blue BO,
28 parts of Anthrene golden orange G,
8 parts of Anthrene jade green,
40 parts of diethylene glycol
are mixed together and evaporated to a weight of 100 parts. A composition is thus obtained which also prints cotton in fast, black prints.

If desired, the assisting agent may be omitted, although if this is done some of the brilliance and strength of the prints are sacrificed.

Example 7

77 parts of Anthrene dark blue BO,
26 parts of Anthrene jade green, and
9.5 parts of Anthrene yellow G
all in paste form, are thoroughly mixed together. This mixture may be used directly for printing fabrics and when so used produces fast, greenish black prints.

It is of course to be understood that while the above examples particularly describe the use of the compositions in printing on cotton, if desired, they may also be used for dyeing from the vat.

It will thus be seen that we have disclosed the preparation of the very valuable and expensive black vat colors by a simple and economical method.

We are aware that numerous details of our process may be varied through a wide range without departing from the spirit of this invention, and we, therefore, do not purpose limiting the patent granted hereon otherwise than necessitated by the prior art.

It should be understood, also, that while we spoke of the adaptability of the products of the various examples for printing cotton, we do not mean to imply that the mixtures specified are adapted for printing cotton directly. Before application to the fiber, these compositions must be incorporated with thickening and reducing agents, in the same manner as when printing with other vat dyestuffs. For clearness, we shall designate hereinafter the pastes directly as produced in the above examples as "dyestuff pastes," and after incorporation of the same with thickening and reducing agents as "printing pastes."

We claim as our invention:

1. A vat dyestuff for coloring fibrous bodies in black shades comprising a composite mixture of dibenzanthrone and a vat dyestuff producing on the fibre a color within the range of orange to yellow, said vat dyestuff forming from 10 to 50% of the mixture.

2. A vat dyestuff for coloring fibrous bodies in black shades comprising a composite mixture of Anthrene dark blue BO and Anthrene yellow G, said yellow component forming from 10 to 50% of the mixture.

3. A dyestuff paste for printing cotton and other fibrous bodies in fast black shades comprising an intimate mixture of dibenzanthrone, a vat dyestuff producing on the fiber a color within the range of yellow to orange and an assisting agent, said vat dyestuff forming from 10 to 50% of the dyestuff mixture.

4. A dyestuff paste for printing cotton and other fibrous materials in fast black shades comprising an intimate mixture of Anthrene dark blue BO, Anthrene yellow G and diethylene glycol, said yellow component forming from 10 to 50% of the dyestuff mixture.

5. As a new article of manufacture, fibrous material dyed with the composition of claim 1.

6. As a new article of manufacture, a cotton material dyed with the composition of claim 2.

7. As a new article of manufacture, fibrous material printed with the composition of claim 3.

8. As a new article of manufacture, a cotton material printed with the composition of claim 4.

In testimony whereof we have hereunto subscribed our names at Carrollville, Milwaukee County, Wisconsin.

EDWARD T. HOWELL.
ROBERT J. GOODRICH.